Dec. 12, 1939.  B. A. TETZLAFF  2,183,175

CLAMP

Filed Feb. 12, 1937

Witness:
Enea Camperini

Inventor:
Benjamin A. Tetzlaff
By: Frank Schraeder Jr.
Atty.

Patented Dec. 12, 1939

2,183,175

UNITED STATES PATENT OFFICE 2,183,175

CLAMP

Benjamin A. Tetzlaff, Riverside, Ill.

Application February 12, 1937, Serial No. 125,423

2 Claims. (Cl. 24—19)

This invention relates to improvements in clamps and has particular reference to hose or pipe clamps.

One of the objects of the invention is to provide a heavy duty clamp in which, through simple manipulation of an adjusting or tightening screw, substantially the entire circumference of the side wall of the clamped member is firmly gripped and pressed to thereby secure a tight connection between the clamped members.

Still another object of the invention is to provide a clamp wherein a single piece of metal band is formed circularly with the ends thereof extending in overlapping position over the tightening nut and in between and beyond the retaining arms of the bridge; the overlapping ends being provided with aligned perforations through which the tightening screw extends into operative connection with the nut.

A further object of the invention is to so design the bridge thereof that the number of standard bridge units for a range of clamps of varying diameters will be reduced to a minimum. To this end the side walls of the arcuate bridge are provided with spaced notches so that the same may be easily bent to the desired radii to accommodate a predetermined range or series of varying clamp diameters. Another important advantage in such spaced notches in the side walls of the bridge is that when the end portions of such side walls are bent downwardly toward one another to form retaining arms for the metal band, the tendency to fracture such side walls is practically overcome and such arms may be easily bent in a hand-operated jig, and further, this feature permits the use of metal of comparatively greater thickness for bridges for extra heavy duty clamps.

A still further object of the invention is to bevel the ends of the base of the bridge to a minimum thickness to thus not only afford the use of comparatively thicker metal for bridges for heavy duty clamps and still maintain a substantially perfect circumferential contact between the clamp and the clamped member, but also to facilitate the sliding of the band between the base and the retaining arms of the bridge during the tightening of the clamp.

With the above and other objects in view, my invention consists in the novel construction and combination of the parts and members shown in preferred embodiment in the attached drawing, described in the following specification and particularly pointed out in the appended claims.

Figure 1:
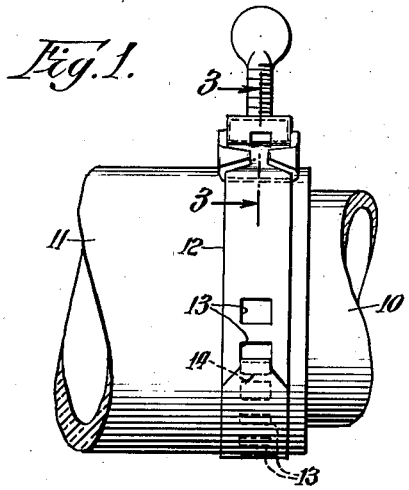
Fig. 1 shows a clamp embodying my invention in side elevation applied to a pair of telescopically connected members such as a pipe and a hose.

Referring now particularly to the clamp shown in Figs. 1 to 4 inclusive, the clamp is illustrated as retaining or connecting a pair of telescoped tubular members; namely, a rigid pipe 10 and a flexible hose 11.

The clamp comprises a single piece of flexible metal band 12 having one end thereof perforated with a plurality of openings 13 which are adapted to be engaged by a hook 14 formed on the other end of the band. It will be noted that the hook 14 is bent inwardly of the band so that when the ends are hooked together about a member such as the hose 11, the end of the hook will be disposed between the side of the hose and the inner face of the perforated end of the band to thus lock the hook therebetween.

Figure 2:
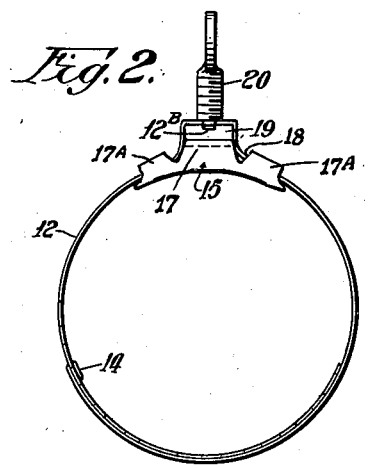
Fig. 2 is an end elevation of the clamp.
Figure 4:
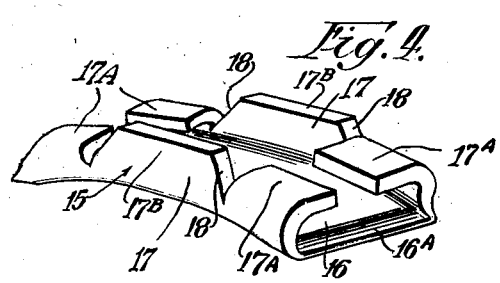
Fig. 4 is an enlarged perspective view of the arcuate bridge.
Figure 3:
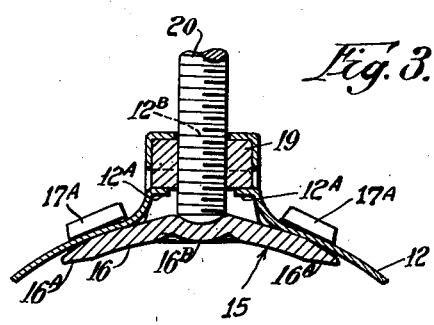
Fig. 3 is an enlarged vertical section taken on line 3—3 of Fig. 1.

An important part of a clamp of this character is the bridge 15 which comprises an arcuate base portion 16 and side walls 17. The side walls 17 are each provided with a pair of V-shaped notches 18 dividing each side wall into an intermediate portion or side wall 17B and end portions 17A comprising integral extension of said base and which are adapted to be bent downwardly toward one another into retaining arms for the band 12, as shown in Figs. 1, 2 and 3. As shown in Fig. 4 the end portions 17A are slightly higher than the intermediate wall portions 17B to afford substantial surface engagement with the band 12 when same are bent into retaining position as shown in Fig. 1.

The ends 16A of the bridge base are tapered or beveled as shown in Figs. 3 and 4.

A portion of the band 12 is bent over the top and two opposite sides of a nut 19 which is held in place by small tongue-like extensions 12A punched and bent from the band 12 to project underneath the nut 19. The opposite edges of the portion of the band extending over the top of the nut 19 are notched to present downwardly disposed bent extensions 12B to retain the nut 19 against lateral displacement. The extensions 12A and 12B facilitate the retainment of the nut during the assembly of the band and bridge 15.

The portion of the metal band 12 which extends over the top of the nut 19 is also provided with an opening for the tightening member 20 which has threaded engagement within the nut 19 and the inner end of which is in engagement with the pressed cup-like upset seat 16^B formed in the base of the bridge 16.

The metal band 12 extends under the bent retaining arms 17^A of the bridge and is slidable between such arms and the bridge base.

Figure 5:
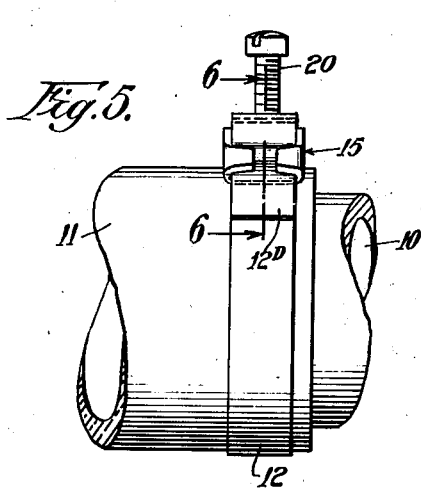
Fig. 5 is a side elevation of a clamp embodying a modification of my invention.
Figure 6:
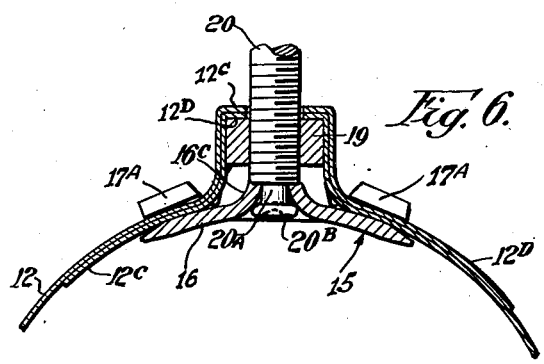
Fig. 6 is an enlarged vertical section taken on line 6—6 of Fig. 5.

In the modified clamp shown in Figs. 5 and 6, the circular metal band 12 is formed with overlapping ends 12^C and 12^D which overlapped end portions extend over the top and sides of the nut 19 and under and preferably slightly beyond the retaining bridge arms 17^A, as clearly shown in Fig. 6. Over the top of the nut 19 the overlapped band portions are provided with concentric openings for the tightening member 20 which has threaded connection within the nut 19 and the inner end of which is formed with a short extension 20^A of decreased diameter for extension into an opening within the outwardly pressed shouldered or upset portion 16^C of the bridge base. The end of the tightening screw member 20 is headed by riveting operation as at 20^B to retain the member 20 within the bridge base but to permit its free rotation within the upset portion 16^C.

From the above description and attached drawing it will be readily apparent that the novel improvements provided will not only increase the efficiency and usefulness of a clamp of this character but its novel structural features will facilitate its assembly during manufacture to thereby reduce its cost. The novel design of the bridge permits the use of metal of comparatively greater thickness for clamps requiring strength for special service and the notches in the sides of the bridge not only overcome their tendency to fracture during the bending operation of the band-retaining arms but such notches readily permit the bending of the arcuate bridge base to accommodate it to correspondingly varying arcs of varying clamp diameters thus affording the standardization of the bridge for a standard clamp adaptable for use on hose or pipe of a varying range of diameters.

I claim:

1. In a clamp including a single band of flexible metal bent into substantially circular form and having a portion thereof bent over a threaded nut, a tightening screw extending through a perforation in said band into threaded engagement with said nut, and a bridge actuated by said screw to tighten said band; said bridge comprising an arcuate base portion, a radially outwardly extending side wall formed integrally with opposite center portions of each of the side edges of said base, opposed pairs of deformable extensions formed on the ends of said side edge portions of said base on either side of said walls, said extensions of each pair being adapted to be bent towards each other over said base to lie in spaced relation to the top of said base and substantially concentric therewith.

2. The structure of claim 1, and said extensions being longer than the height of said walls.

BENJAMIN A. TETZLAFF.